(12) United States Patent
Nakamura

(10) Patent No.: US 8,637,178 B2
(45) Date of Patent: Jan. 28, 2014

(54) ELECTRODE FOR A POWER STORING APPARATUS AND POWER STORING APPARATUS PROVIDED WITH THAT ELECTRODE

(75) Inventor: Yoshiyuki Nakamura, Nishikamo-gun (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 953 days.

(21) Appl. No.: 12/438,402

(22) PCT Filed: Aug. 21, 2007

(86) PCT No.: PCT/IB2007/002392
§ 371 (c)(1),
(2), (4) Date: Feb. 23, 2009

(87) PCT Pub. No.: WO2008/023240
PCT Pub. Date: Feb. 28, 2008

(65) Prior Publication Data
US 2010/0003598 A1 Jan. 7, 2010

(30) Foreign Application Priority Data
Aug. 25, 2006 (JP) .................................. 2006-228984

(51) Int. Cl.
*H01M 2/18* (2006.01)
*H01M 6/46* (2006.01)
*H01M 4/02* (2006.01)

(52) U.S. Cl.
USPC ........... 429/154; 429/133; 429/140; 429/144; 429/209

(58) Field of Classification Search
None
See application file for complete search history.

(56) References Cited

U.S. PATENT DOCUMENTS

| | | | | |
|---|---|---|---|---|
| 4,354,115 A * | 10/1982 | Warabisako et al. | .......... | 250/551 |
| 6,203,948 B1 * | 3/2001 | Kao et al. | ........................ | 429/241 |
| 6,893,777 B2 * | 5/2005 | Probst | ........................... | 429/233 |
| 7,000,297 B2 * | 2/2006 | Frustaci et al. | ...................... | 29/2 |
| 7,291,186 B2 * | 11/2007 | Zhang | ........................... | 29/623.1 |
| 2005/0175902 A1 * | 8/2005 | Parsian | ........................... | 429/241 |

FOREIGN PATENT DOCUMENTS

| | | |
|---|---|---|
| JP | 61-194258 U | 12/1986 |
| JP | 05-314994 A | 11/1993 |
| JP | 10-064514 A | 3/1998 |
| JP | 2001-035484 A | 2/2001 |
| JP | 2005-011660 A | 1/2005 |
| JP | 2005-071784 A | 3/2005 |
| JP | 2005-190685 A | 7/2005 |
| WO | WO 2006/119289 A | 11/2006 |

* cited by examiner

*Primary Examiner* — Melvin C Mayes
*Assistant Examiner* — Sheng H Davis
(74) *Attorney, Agent, or Firm* — Kenyon & Kenyon LLP

(57) ABSTRACT

An electrode for a power storing apparatus has a collector and a plurality of electrode patterns formed on at least one surface of the collector. An electrode pattern in a region where heat is radiated less than in other region, from among the plurality of electrode patterns, has a lower formation density than an electrode pattern in the other region.

15 Claims, 9 Drawing Sheets

ELECTRODE FOR A POWER STORING APPARATUS AND POWER STORING APPARATUS PROVIDED WITH THAT ELECTRODE

This is a 371 national phase application of PCT/IB2007/002392 filed 21 Aug. 2007, claiming priority to Japanese Patent Application No. 2006-228984 filed 25 Aug. 2006, the contents of which are incorporated herein by reference.

BACKGROUND OF THE INVENTION

1. Field of the Invention

The invention relates to an electrode for a power storing apparatus, which used in a power storing apparatus such as a secondary battery or a capacitor, and a power storing apparatus provided with this electrode.

2. Description of the Related Art

An electrode (i.e., a positive electrode or a negative electrode) used in a secondary batter or the like is known in which a uniform electrode layer (i.e., a negative electrode layer or a positive electrode layer) is applied to the entire surface of a collector. However, when the electrode layer is formed on the entire surface of the collector, stress that acts on the electrode, such as stress that is generated when the electrode layer is formed or stress due to vibrations or the like from the outside may cause cracks or the like in the electrode layer.

Japanese Patent Application Publication No. 2005-11660 (hereinafter referred to as "JP-A-2005-11660") proposes a structure that alleviates stress on the electrode by forming a plurality of minute cells as the electrode layer on the collector. More specifically, a plurality of minute cells are arranged in a matrix at equal intervals on the surface of the collector. On the other hand, Japanese Patent Application Publication No. 2005-71784 (hereinafter referred to as "JP-A-2005-71784") proposes a structure that uses a plurality of cooling tabs and maximizes the radiation effect of the cooling tabs provided near a center layer in order to suppress variations in temperature between the the center layer side and the outer layer side of a stacked battery.

However, in the electrode for a secondary battery described in JP-A-2005-11660, the intervals between the plurality of minute cells formed on the collector are set evenly, which has the following adverse effects. With a battery having a stacked structure, for example, generated heat during charge and discharge tends to build up in the central portion more so than in the outer peripheral portion of the electrode. When heat builds up in the central portion of the electrode, the internal resistance of the central portion decreases, and as a result, current tends to flow more easily through the central portion. Large amounts of current flowing through the central portion promote heat generation in the central portion so the internal resistance of the central portion decreases even more. As a result, the electrode degrades. Also, for the reason stated above, the temperature distribution on the surface of the electrode is such that the temperature is highest at the central portion and gradually drops toward the outer peripheral side.

Here, JP-A-2005-11660 mentions that the minute cells may be regularly arranged in one region on the collector and irregularly arranged in other regions. However, this structure alone is not enough to uniformly distribute the temperature on the electrode. That is, with the electrode for a secondary battery described in JP-A-2005-11660, the minute cells are not arranged taking the temperature distribution on the electrode into account.

On the other hand, with the stacked battery described in JP-A-2005-71784, for example, the cooling tabs must be provided separately so the number of parts is increased. Also, the structure described in JP-A-2005-71784 changes the radiation effect in the direction of thickness (i.e., in the stacking direction) of the stacked battery, but does not take into account heat radiation based on the temperature distribution in a direction orthogonal to the direction of thickness of the stacked battery (in other words, the in-plane of the collector).

SUMMARY OF THE INVENTION

This invention thus provides an electrode for a power storing apparatus, which may suppress variation in the temperature distribution on the electrode with a simple configuration, and a power storing apparatus provided with that electrode.

An electrode for a power storing apparatus according to a first aspect of the invention has a collector and a plurality of electrode patterns with active material formed on at least one surface of the collector. In particular, an electrode pattern with active material in a region where heat is radiated less than in other region, from among the plurality of electrode patterns with active material, has a lower formation density than an electrode pattern with active material in the other region.

Here, the region where heat is radiated less than in other region may be a central portion of the collector, and the other region may be an end portion of the collector.

Also, an interval between adjacent electrode patterns with active material on the central portion of the collector may be formed larger than an interval between adjacent electrode patterns with active material on the end portion of the collector.

Further, the plurality of electrode patterns with active material may be formed such that the interval between adjacent electrode patterns with active material becomes larger from the end portion of the collector toward the central portion of the collector.

In this case, each of the plurality of electrode patterns with active material may have substantially the same size.

Moreover, a size of the electrode pattern with active material positioned on the central portion of the collector may be formed smaller than a size of the electrode pattern with active material positioned on the end portion of the collector.

Also, the plurality of electrode patterns with active material may be formed such that the sizes of the electrode patterns with active material become smaller from the end portion of the collector toward the central portion of the collector.

Further, a thickness of the electrode pattern with active material positioned on the central portion of the collector may be thinner than a thickness of the electrode pattern with active material positioned on the end portion of the collector.

Moreover, when the electrode is cylindrically rolled up, an interval between adjacent electrode patterns with active material on an inside in a radial direction of the power storing apparatus, from among the plurality of electrode patterns with active material, may be formed larger than an interval between adjacent electrode patterns with active material on an outside in the radial direction of the power storing apparatus.

Also, when the electrode is rolled up cylindrically, a size of an electrode pattern with active material on an inside in a radial direction of the power storing apparatus, from among the plurality of electrode patterns with active material, may be formed smaller than a size of an electrode pattern with active material on an outside in the radial direction of the power storing apparatus.

Also, when the plurality of electrode patterns with active material are formed substantially concentric on the collector, an interval between adjacent electrode patterns with active material on a radial inside may be formed wider than an interval between adjacent electrode patterns with active material on a radial outside.

Also, a density of active material of the electrode pattern with active material positioned on the central portion of the collector may be lower than a density of active material of the electrode pattern with active material positioned on the end portion of the collector.

Also, when a heat source is arranged adjacent to the power storing apparatus, the formation density of an electrode pattern with active material in a region adjacent to the heat source, from among the plurality of electrode patterns with active material, may be lower than the formation density of an electrode pattern with active material in another region.

Also, A power storing apparatus according to a second aspect of the invention includes the foregoing electrode that is used as at least one of a positive electrode and a negative electrode.

Also, A power storing apparatus according to a third aspect of the invention includes a plurality of stacked electrodes. In particular, each of the plurality of electrodes has a collector and a plurality of electrode patterns with active material formed on at least one surface of the collector. An electrode pattern with active material in a region where heat is radiated less than in other region among the plurality of stacked electrodes has a lower formation density than an electrode pattern with active material in the other region. The formation densities of the plurality of electrode patterns with active material among the plurality of stacked electrodes, differ from one another depending on position of the electrode in the stacking direction.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

In the following description and the accompanying drawings, the present invention will be described in more detail in terms of example embodiments.

Figure 1:
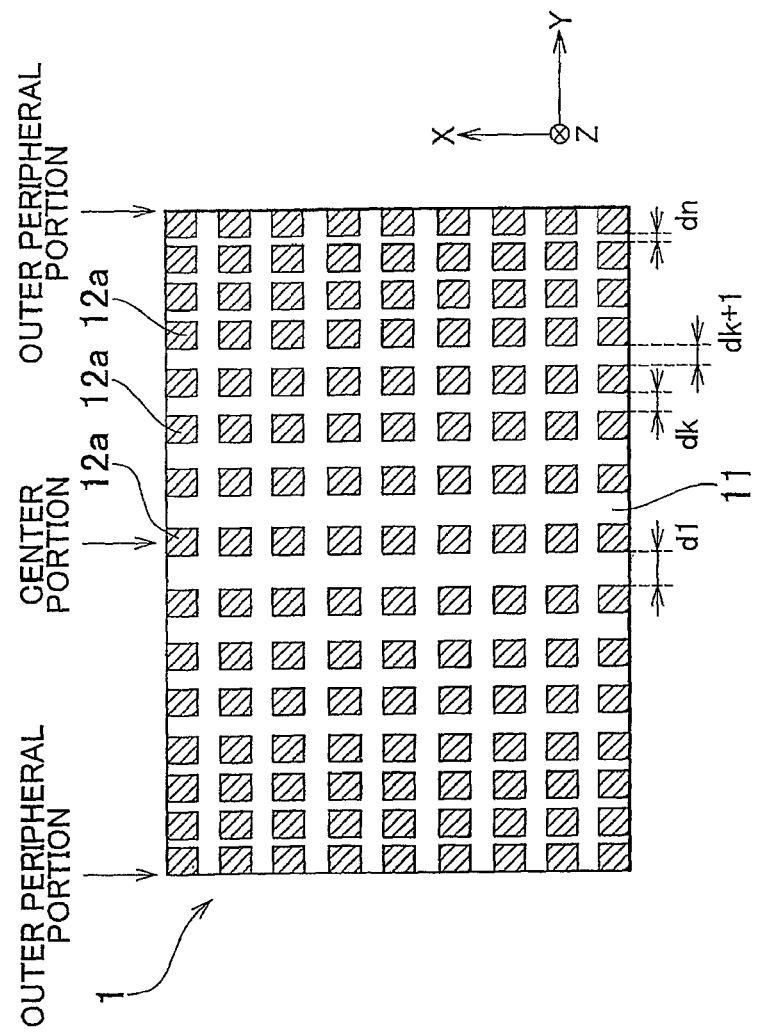
FIG. 1 is a front view of a bipolar electrode according to a first example embodiment of the invention.
Figure 2:
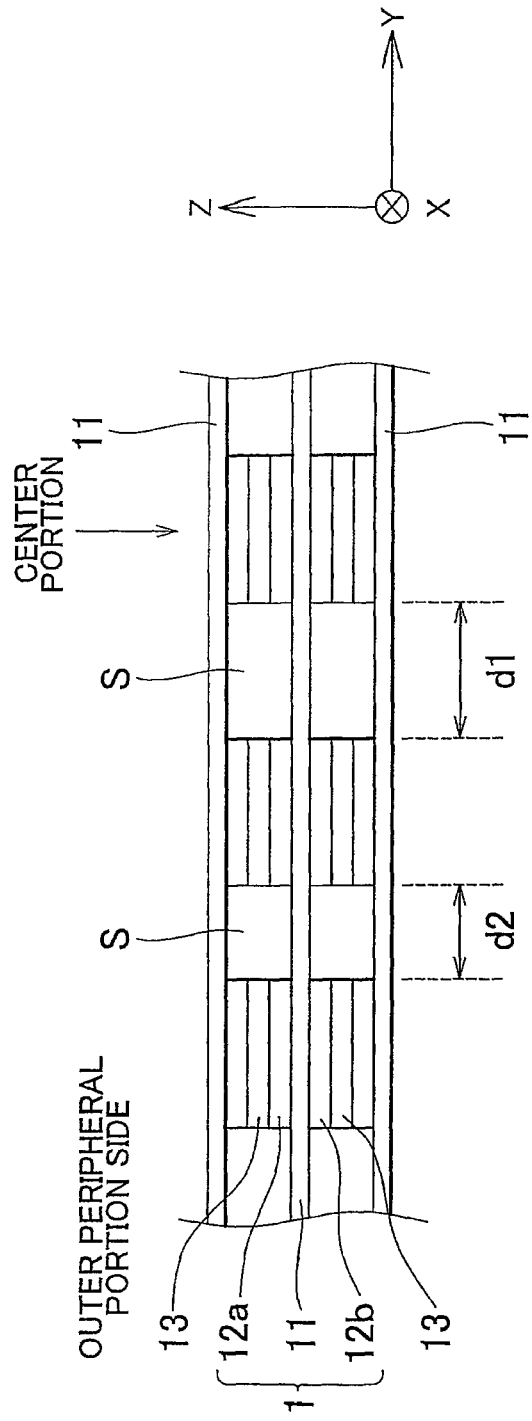
FIG. 2 is a side view of the bipolar electrode according to the first example embodiment.

A bipolar battery according to a first example embodiment will be described with reference to FIGS. 1 and 2. Here, this bipolar battery may be regarded as the "power storing apparatus" of the invention. FIG. 1 is a front view of a bipolar electrode used in the bipolar battery according to the first example embodiment, and FIG. 2 is a side view of the bipolar type battery having a structure in which the bipolar electrodes are stacked. Here, the bipolar electrode is such that a positive electrode layer is formed on one side of a collector and a negative electrode layer is formed on the other side of the collector. FIG. 1 shows one side of the bipolar electrode (i.e., the side on which the positive electrode layer is formed). In the first example embodiment, although FIG. 1 shows the structure of the positive electrode layer on one side of the bipolar electrode, the structure of the negative electrode layer on the other side (i.e., the back side) is the same.

Also, in the following example embodiment, a bipolar type secondary battery will be described, but the invention may also be applied to a secondary battery that is not a bipolar type secondary battery. Here, in a secondary battery that is not a bipolar type secondary battery, an electrode in which an identical electrode layer (a positive electrode layer or a negative electrode layer) is formed on both sides of the collector may be used, or an electrode in which an electrode layer is formed on only one side of the collector may be used. Further, in the following example embodiment, a secondary battery is described, but the invention may also be applied to a stacked capacitor (i.e., an electrical double layer capacitor) that serves as the power storing apparatus. This stacked capacitor is such that a plurality of positive and negative electrodes are alternately stacked together with separators in between. In this stacked capacitor, aluminum foil may be used for the collectors, activated carbon may be used for the active material of the positive and negative electrodes, and a porous membrane made of polyethylene may be used for the separators.

Also, in the following example embodiment, a stacked battery is described, but the structure of the battery is not limited to this. The invention may also be applied to a battery other than a stacked (i.e., flat) battery, such as a rolled (i.e., cylindrical) battery.

In FIGS. 1 and 2, a bipolar electrode 1 has a collector 11 which serves as a base. A plurality of electrode patterns 12a which serve as positive electrode layers are formed (in the X-Y plane) on one side of the collector 11. Also, a plurality of electrode patterns 12b which serve as negative electrode layers are formed on the other side of the collector 11 (see FIG. 2). The collector 11 may be made of, for example, aluminum foil or a plurality of metals. Also, a metal surface covered with aluminum may also be used as the collector 11. Incidentally, although not a bipolar electrode, a so-called composite collector in which plural sheets of metal foil have been laminated together may also be used. When this composite collector is used, aluminum or the like may be used for the material of the positive electrode collector and nickel or copper or the like may be used as the material for the negative electrode collector. A structure in which the positive electrode collector and the negative electrode collector are in direct contact with one another, or a structure in which a conductive layer is provided between the positive electrode collector and the negative electrode collector may also be used as the composite collector.

The electrode patterns 12a and 12b are formed with active material, electrical conducting material, an additive, or the like, according to the positive or negative electrode. Materials such as the following may be used to make the electrode patterns 12a and 12b. For example, with a nickel-metal-hydride battery, nickel oxide may be used for the active material of the positive electrode of the electrode pattern 12a, and a hydrogen-absorbing alloy such as $MMNi_{(5-x-y-z)}Al_xMn_yCo_z$ (Mm: Misch metal, an alloy of rare earth elements) may be used for the active material of the negative electrode of the electrode pattern 12b. Also, in a lithium secondary battery, lithium-transition metal composite oxide may be used for the active material of the positive electrode of the electrode pattern 12a, and carbon may be used as the active material of the negative electrode of the electrode pattern 12b. Also, acetylene black, carbon black, graphite, carbon fiber, or carbon nanotube may be used as the electrical conducting material.

The electrode patterns 12a and 12b may be formed on the collector 11 using the inkjet method or the like. As shown in FIG. 1, all of the electrode patterns 12a are formed in rectangular shapes and have generally the same size (area) (including manufacturing error). Also, the thickness of the electrode patterns 12a (i.e., the length in the Z direction) is substantially the same value (including manufacturing error) in all of the electrode patterns 12a. Furthermore, the plurality of electrode patterns 12a are arranged in a matrix in the X-Y plane. Also, an ion conducting layer 13 having the same shape as the electrode patterns 12a and 12b is formed on the electrode patterns 12a and 12b of the bipolar electrode 1. This ion conducting layer 13 may be formed of a solid polyelectrolyte having ion conductivity (such as polyethylene oxide or polypropylene oxide).

Incidentally, in an electrode used in a non-bipolar type battery, a polymer gel electrolyte may be used as the ion conducting layer 13. In the first example embodiment, the ion conducting layer 13 is formed in the same shape as the electrode patterns 12a and 12b, but it is not limited to this. For example, a plate-shaped electrolyte membrane or a plate shaped body in which a separator has been impregnated with an electrolyte may also be used. As shown in FIG. 1, the intervals between two adjacent electrode patterns 12a in the Y direction among the plurality of electrode patterns 12a, are different. That is, the intervals between adjacent electrode patterns 12a are set to gradually become smaller from the central portion of the bipolar electrode (i.e., the collector 11) toward the outer peripheral portion.

More specifically, as shown in FIG. 1, it is assumed that an interval between an electrode pattern 12a positioned at the central portion of the collector 11 and an electrode pattern 12a adjacent to this electrode pattern 12a in the Y direction, i.e., the length in the Y direction of a region where no electrode pattern 12a is formed at the central portion of the collector 11, is "dl". Similarly, it is assumed that an interval between an electrode pattern 12a positioned on an outer peripheral portion (i.e., an end portion) of the collector 11 and an electrode pattern 12a that is adjacent to this electrode pattern 12a in the Y direction is "dn". Also, it is assumed that an interval between adjacent electrode patterns 12a in an arbitrary position in the Y direction is "dk". In this case, the relationship between dl, dn, and dk is such that dl> . . . dk>dk−1> . . . dn. Here, "k" is an arbitrary value within a range of 1 to n. Also, the interval (dl . . . dn) between adjacent electrode patterns 12a may be set taking into account the temperature distribution curve of a typical bipolar electrode (i.e., an electrode in which an electrode layer is formed on the entire surface of a collector).

Figure 3:
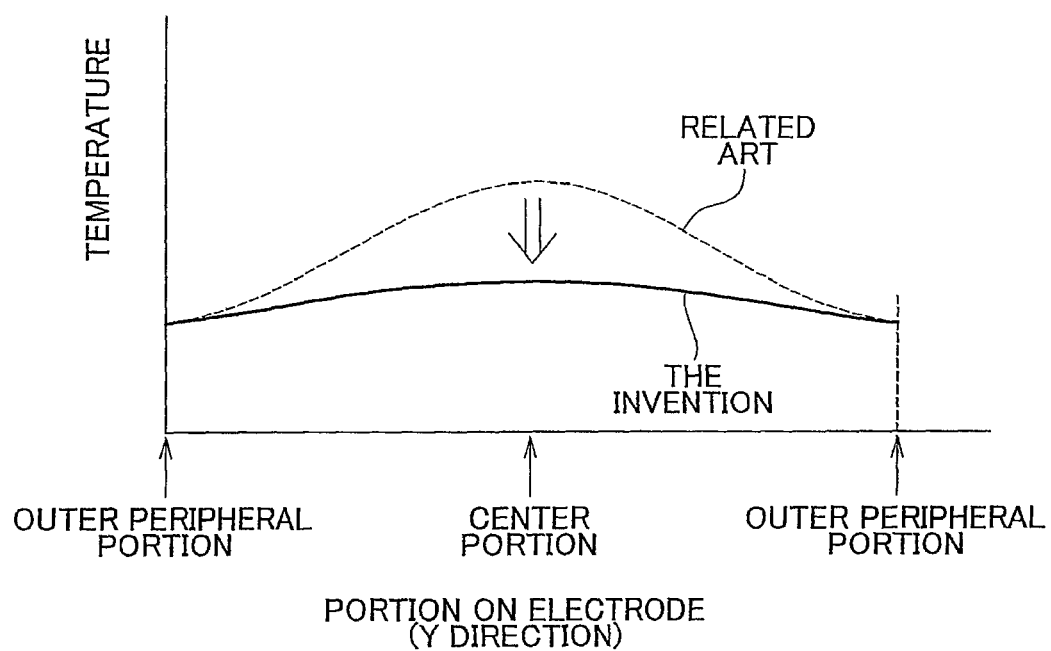
FIG. 3 is a graph showing the relationship between temperature and position on the bipolar electrode.

In the graph in FIG. 3, the temperature distribution curve of a typical bipolar electrode is shown by the dotted line. The vertical axis of the graph represents the temperature on the bipolar electrode and the horizontal axis represents the position (i.e., the position in the Y direction in FIG. 1) on the bipolar electrode. As shown by the dotted line in FIG. 3, with a typical bipolar electrode, heat tends to build up in the central portion so the temperature at the central portion is higher than it is at any other portion. The temperature gradually drops from the central portion of the bipolar electrode toward the outer peripheral portion. This is because heat escapes easier on the outer peripheral portion side of the bipolar electrode.

Incidentally, even when a plurality of electrode patterns (minute cells) are arranged in a matrix at equal intervals as described in JP-A-2005-11660, a temperature distribution curve is similar to that shown by the dotted line in FIG. 3. Taking the temperature distribution curve shown by the dotted line in FIG. 3 into account, it is preferable to make the interval (dl) between the electrode patterns 12a at the central portion the widest and make the intervals between the electrode patterns 12a gradually smaller toward the outer peripheral portion sides. Arranging the electrode patterns 12a in this way enables the temperature distribution curve on the bipolar electrode 1 that is shown by the solid line in FIG. 3 to be obtained. That is, the heat radiation efficiency on the central portion side of the bipolar electrode 1 may be improved, and variation in the temperature distribution of the bipolar electrode 1 may be suppressed. In particular, making the intervals between the electrode patterns 12a gradually larger from the outer peripheral portion side toward the central portion side enables the temperature distribution of the bipolar electrode 1 to be made substantially uniform.

With the bipolar battery of the first example embodiment, spaces S are formed between stacked collectors 11, as shown in FIG. 2. Here, the intervals between adjacent electrode patterns 12a on the central portion side of the bipolar electrode 1 are wider than the intervals between adjacent electrode patterns 12a on the outer peripheral portion side so the spaces S on the central portion side are larger than the spaces S on the outer peripheral portion side. Therefore, heat generated on the central portion side of the bipolar electrode 1 may escape easier to the outside via the relative large spaces S, thereby improving the heat radiation efficiency on the central portion side of the bipolar electrode. Incidentally, cooling air may be supplied into the spaces S from outside of the bipolar battery. In this case, an increase in the temperature on the bipolar electrode may be efficiently suppressed.

Incidentally, in this first example embodiment, the intervals between adjacent electrode patterns 12a in the Y direction are made gradually larger from the outer peripheral portion of the collector 11 toward the central portion, but the invention is not limited to this. More specifically, the invention may also include a case in which the intervals between adjacent electrode patterns 12a are the same in one region (for example, a case in which dk=dk−1; see FIG. 1). That is, even if the intervals between adjacent electrode patterns 12a are not made different, as long as the temperature difference on the bipolar electrode 1 is substantially zero, the intervals between adjacent electrode patterns 12a may be set at the same value. According to this first example embodiment, by forming the plurality of electrode patterns 12a (12b) on the collector 11, heat distortion in a specific direction (the X direction or the Y direction) of the bipolar electrode 1 may be suppressed even if the temperature of the battery changes or the respective thermal expansion coefficients of the collector 11, the electrode patterns 12a and 12b, and the ion conducting layer 13 are different. Moreover, cracking or the like of the electrode layer due to stress applied to the bipolar electrode may be suppressed compared with a case in which an electrode layer is formed on the entire surface of the collector 11. Also, forming the plurality of electrode patterns 12a (12b) at intervals enables the bipolar electrode 1 to bend easily so the bipolar electrode 1 may be arranged along a curved surface. This improves the degree of freedom with respect to the location where the battery may be arranged.

Figure 4:
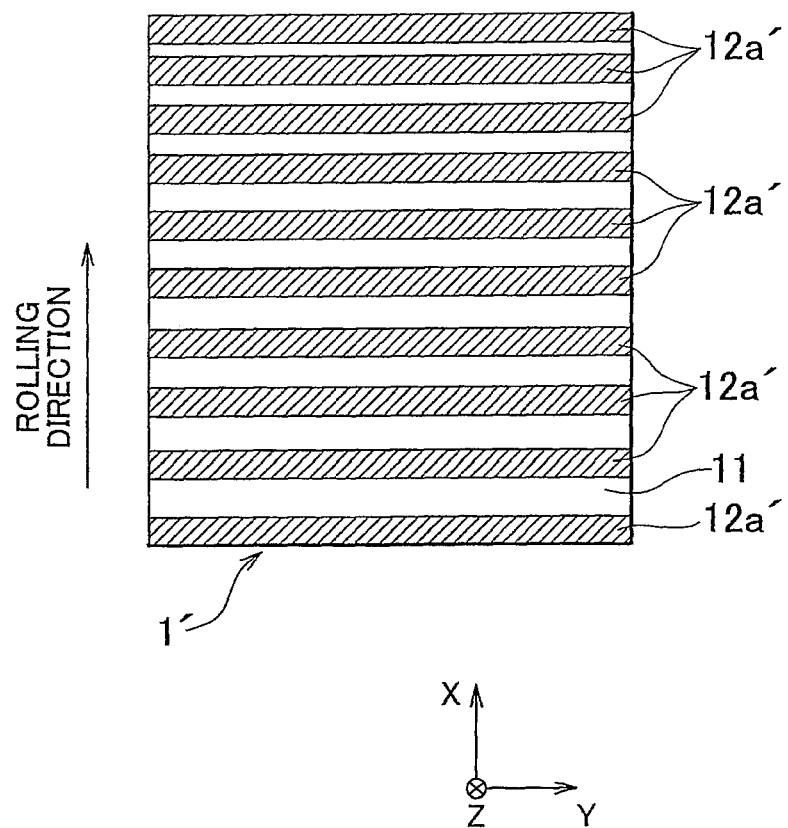
FIG. 4 is a front view of a bipolar electrode used in a cylindrical battery.

Here, a cylindrical battery may also be formed by rolling up the bipolar electrode (or an electrode other than a bipolar electrode). More specifically, as shown in FIG. 4, a plurality of electrode patterns 12a' that extend in the Y direction are formed on the collector 11. Here, the widths (i.e., the length in the X direction) of the plurality of electrode patterns 12a' are substantially the same. Also, the intervals between adjacent electrode pattern 12a' in the X direction gradually become smaller from the lower side to the upper side in FIG. 4. However, a portion may also be included in which the intervals between adjacent electrode patterns 12a' in the X direction are substantially the same (including manufacturing error).

Then, the cylindrical battery is formed by rolling up a bipolar electrode 1' shown in FIG. 4 along the direction shown by the arrowed line from the end portion positioned on the lower side in FIG. 4. In the cylindrical battery formed by rolling up a single bipolar electrode in this way, heat tends to remain in the inner region in the radial direction (i.e., the stacking direction of the bipolar electrode) more than it does in the outer region in the radial direction. Therefore, the heat radiation on the radially inner region may be improved by making the intervals between adjacent electrode patterns 12a' in the radially inner region (i.e., the region on the lower side in FIG. 4) wider than the intervals between adjacent electrode patterns 12a' in the radially outer region (i.e., the region on the upper side in FIG. 4), as shown in FIG. 4. Therefore, variation in the temperature distribution may be suppressed in a cylindrical battery as well.

Figure 5:
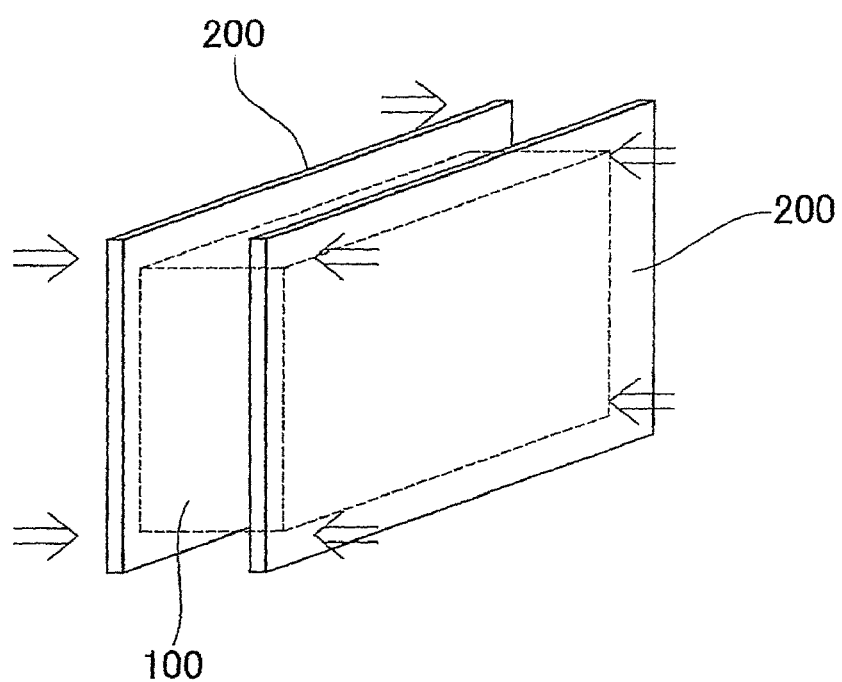
FIG. 5 is a view of a retaining structure of a bipolar battery.

On the other hand, the bipolar battery of the first example embodiment is structured such that a bipolar battery 100 is sandwiched on both sides (i.e., in the stacking direction of the bipolar electrode 1) by retaining members 200, as shown in FIG. 5, in order to suppress thermal expansion at the bipolar electrode 1. More specifically, the retaining members 200 sandwich the bipolar battery 100 on the outer peripheral portion sides of the bipolar battery 100, as shown by the arrows in FIG. 5. This structure enables thermal expansion to be suppressed on the outer peripheral portion sides of the bipolar batter 100 but not on the central portion side. As a result, only the region on the central portion side may be displaced by thermal expansion. Using the bipolar electrode 1 of the first example embodiment, however, enables this thermal expansion on the central portion side of the bipolar electrode 1 to be suppressed because the heat radiation efficiency on the central portion side of the bipolar electrode 1 is higher than the heat radiation efficiency on the outer peripheral portion side. Thus, it is possible to suppress only the region on the central portion side of the bipolar battery 100 from being displaced due to thermal expansion even when the structure shown in FIG. 5 is used.

Incidentally, in the first example embodiment, the intervals between adjacent electrode patterns 12a are made different in the Y direction, as shown in FIG. 1, but the invention is not limited to this. That is, the intervals between adjacent electrode patterns 12a may be made different in the X direction, or the intervals between adjacent electrode patterns 12a may be made different in both the X direction and the Y direction. In this case as well, the intervals between the electrode patterns 12a on the central portion side of the bipolar electrode 1 only need to be made larger than the intervals between the electrode patterns 12a on the outer peripheral portion side. Here, variation in the temperature distribution in the X and Y directions of the bipolar electrode 1 may be suppressed by making the intervals between adjacent electrode patterns 12a different in the X and Y directions.

Also, in the first example embodiment, each of the electrode patterns 12a is formed in a rectangular shape, but the invention is not limited to this. That is, the electrode patterns may also be formed in a variety of other shapes as well. For example, the electrode patterns may be circular or polygonal such as triangular. Also, electrode patterns of different shapes may also be formed on the collector.

Furthermore, in the first example embodiment, the plurality of electrode patterns 12a are arranged in a matrix as shown in FIG. 1, but the invention is not limited to this. For example, electrode patterns may be concentrically arranged around an electrode pattern that is arranged at the central portion of the bipolar electrode. In this case as well, the intervals between adjacent electrode patterns on the central portion side of the bipolar electrode are set wider than the intervals between adjacent electrode patterns on the outer peripheral portion side. Arranging electrode patterns concentrically in this way enables variation in the temperature distribution in every direction in the X-Y plane to be suppressed in the bipolar electrode.

Figure 6:
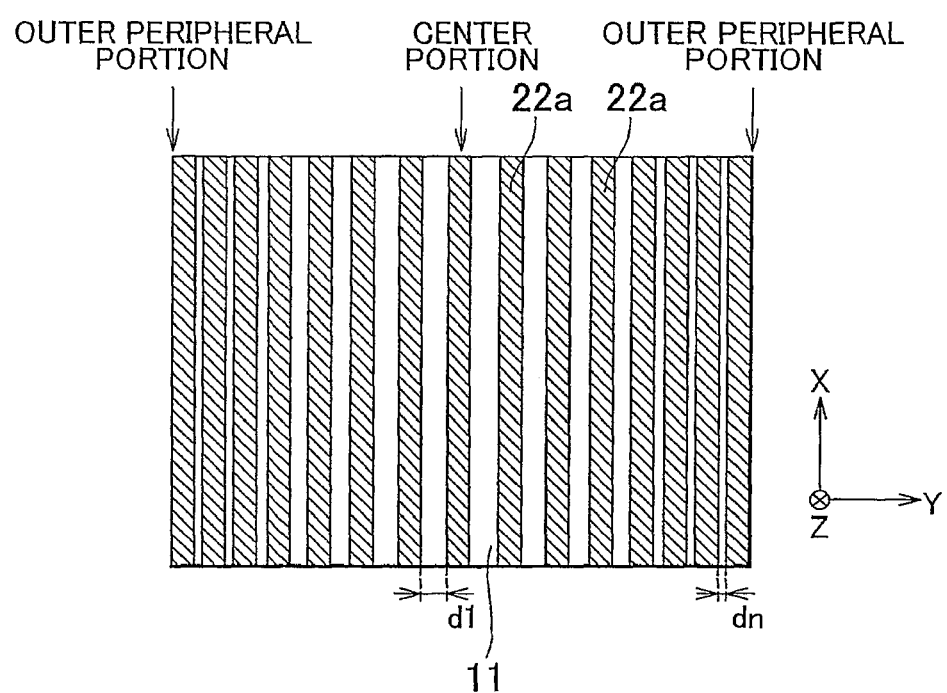
FIG. 6 is a front view of a bipolar electrode according to a modified example of the first example embodiment.

Also, in this example embodiment, the plurality of electrode patterns 12a are arranged in a matrix in the X-Y plane as shown in FIG. 1, but a plurality of electrode patterns 22a that extend in the X direction may also be arranged lined up in the Y direction as shown in FIG. 6. In this case as well, the intervals between adjacent electrode patterns 22a are set so that they become smaller from the central portion of the collector 11 toward the outer peripheral portion.

Figure 7:
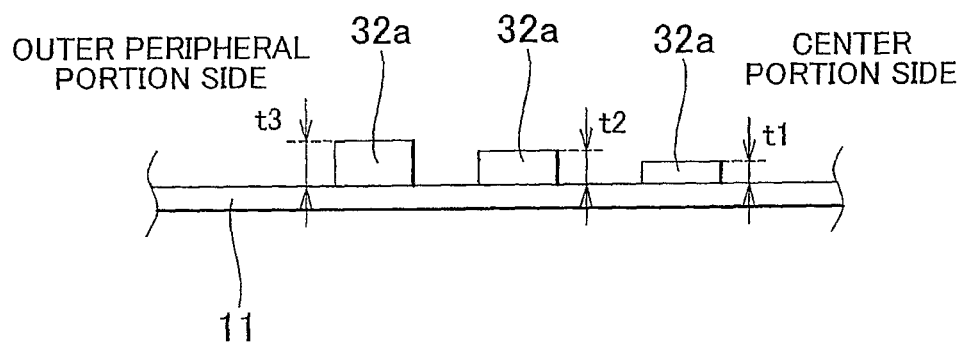
FIG. 7 is a side view of the bipolar electrode according to a modified example of the first example embodiment.

Moreover, in the first example embodiment, the thickness (i.e., the length in the Z direction in FIG. 2) of each electrode pattern 12a formed on the collector 11 is set at substantially the same value for all of the electrode patterns 12a, but the invention is not limited to this. That is, the thickness of the electrode patterns 12a may be changed depending on the position of the electrode pattern 12a on the collector 11. More specifically, of two adjacent electrode patterns in a specific direction (such as the X direction or the Y direction), an electrode pattern positioned on the central portion side may be made thinner than an electrode pattern positioned on the outer peripheral portion side. Also, as shown in FIG. 7, electrode patterns 32a may be made gradually thinner from the outer peripheral portion of the bipolar electrode toward the central portion ($t1<t2<t3$). However, at least two electrode patterns having substantially the same thickness (including manufacturing error) may also be included. In this way, when the thicknesses of the electrode patterns 32a are different, the thickness of the ion conducting layer (which corresponds to the ion conducting layer 13 shown in FIG. 2) is also different. That is, the intervals between two stacked collectors is fixed so if the thicknesses of the electrode patterns 32a are different, then the thickness of the ion conducting layer is different. As described above, if the electrode patterns 32a on the central portion side of the collector 11 are made thinner, the current density at the central portion side is reduced, thereby enabling heat generation on the central portion side to be suppressed. This makes it possible to suppress variation in the temperature distribution on the bipolar electrode.

On the other hand, the density of the active material of which the electrode patterns 12a are made (i.e., the volume of the active material of the positive electrode that accounts for the electrode patterns 12a) may be made different depending on the position on the collector 11. More specifically, the density of the active material of an electrode pattern 12a positioned on the central portion side of the bipolar electrode 1 may be made lower than the density of the active material of an electrode pattern 12a positioned on the outer peripheral side. Also, the density of the active material of the electrode patterns 12a may be gradually reduced from the outer peripheral portion toward the central portion. However, at least two electrode patterns having substantially the same density of the active material (including manufacturing error) may also be included. By reducing the density of the active material of the electrode patterns 12a positioned on the central portion side as described above, the current density on the central portion side may be reduced, thereby suppressing heat generation on the central portion side. This makes it possible to suppress variation in the temperature distribution on the bipolar electrode.

Also, taking the temperature distribution on the bipolar electrode into account, the electrode patterns may also be formed based on three parameters, i.e., the intervals between the electrode patterns, the thickness of the electrode patterns, and the density of the active material of the electrode patterns. By making not only the intervals between the electrode patterns 12a different but also the thickness of the electrode patterns and the density of the active material different, the region where no electrode patterns are formed on the surface of the collector 11 may be made smaller.

On the other hand, in the first example embodiment, the electrode patterns are arranged differently on the bipolar electrode. However, in a bipolar battery in which bipolar electrodes are stacked, the electrode patterns may be arranged differently depending on their position in the direction of thickness (i.e., the stacking direction of the bipolar electrodes) of the battery. Here, with a bipolar battery having a stacked structure, the ease with which heat escapes on the center layer side in the stacking direction is different from that on the outer layer side in the stacking direction so the temperature distribution on each bipolar electrode is different. Therefore, by making the arrangement of the electrode patterns on the bipolar electrode different depending on the position of the bipolar electrode in the stacking direction, variation in the temperature distribution may be suppressed in each bipolar electrode in the stacking direction.

More specifically, when comparing an interval between electrode patterns of a bipolar electrode positioned on the center layer side in the stacking direction and an interval which is in a corresponding position between electrode patterns of a bipolar electrode positioned on the outer layer side in the stacking direction, the interval between electrode patterns of the bipolar electrode positioned on the center layer side may be set larger than the interval in a corresponding position between electrode patterns of the bipolar electrode positioned on the outer layer side. For example, an interval dl (see FIG. 1) between electrode patterns of the bipolar electrode positioned on the center layer side may be set wider than a corresponding interval dl between electrode patterns of the bipolar electrode positioned on the outer layer side.

Figure 8:
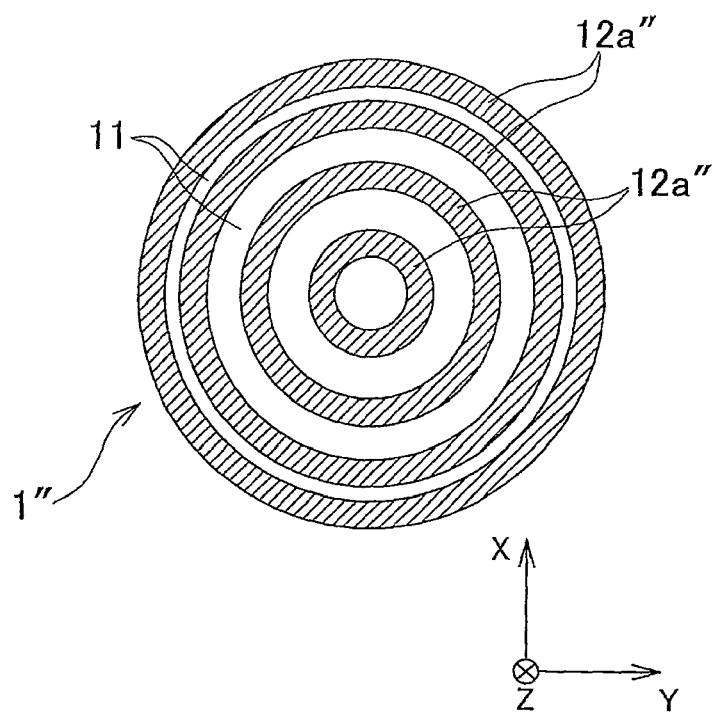
FIG. 8 is a front view of a concentric bipolar electrode.

On the other hand, the bipolar electrode may also be structured as shown in FIG. 8. Here, FIG. 8 is a front view of the concentric bipolar electrode. In the structure shown in FIG. 8, a plurality of electrode patterns 12a" are formed substantially concentrically on a substantially circular collector 11. Here, the widths (i.e., lengths in the radial direction) of the electrode patterns 12a" are substantially the same (including manufacturing error). Also, the intervals between adjacent electrode patterns 12a" in the radial direction gradually increase from the outer peripheral portion toward the central portion. However, a portion in which the intervals between adjacent electrode patterns 12a" are substantially the same (including manufacturing error) may also be included. In the structure of a bipolar electrode 1" shown in FIG. 8, heat tends to remain in the inner region in the radial direction more than it does in the outer region in the radial direction. Therefore, by making the intervals between the electrode patterns 12a" on the inside in the radial direction wider than the intervals between the electrode patterns 12a" on the outside in the radial direction, as described above, the heat radiation on the inside in the radial direction may be improved. This makes it possible to suppress variation in the temperature distribution in the X-Y plane.

Here, a cylindrical battery may be formed by stacking a plurality of the bipolar electrodes 1" shown in FIG. 8 in the Z direction. Incidentally, when stacking the plurality of bipolar electrodes 1", the temperature of the bipolar electrode 1" positioned on the center layer side may become higher than the temperature of the bipolar electrode 1" positioned on the outer layer side. Therefore, the structure of the bipolar electrode 1" on the center layer side (more specifically, the intervals between adjacent electrode patterns 12a") may be made different from the structure of the bipolar electrode 1" on the outer layer side. For example, the intervals between the adjacent electrode patterns 12a" in a corresponding region in the stacking direction (i.e., the Z direction) may be made different. More specifically, the intervals between adjacent electrode patterns 12a" of the bipolar electrode 1" on the center layer side may be made wider than the corresponding intervals between the adjacent electrode patterns 12a" of the bipolar electrode 1" on the outer layer side. This also makes it possible to suppress variation in the temperature distribution in the stacking direction. Incidentally, in addition to the structures shown in FIGS. 4 and 8, the thickness of the electrode patterns may be made different as shown in FIG. 7, and the density of the active material included in the electrode patterns may also be made different.

Next, a bipolar battery according to a second example embodiment of the invention will be described with reference to FIG. 9.

Figure 9:
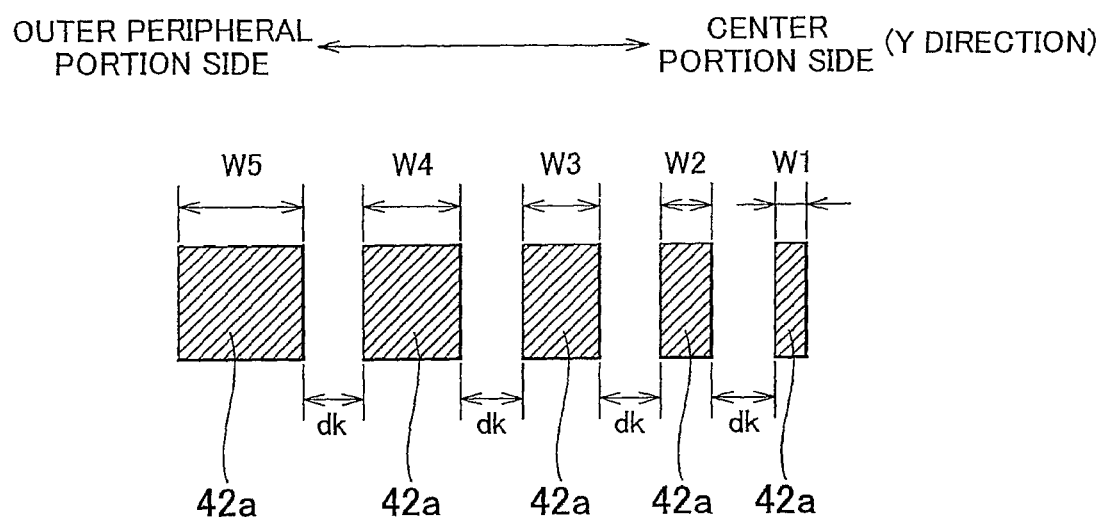
FIG. 9 is a schematic showing the structure of an electrode pattern in a bipolar electrode according to a second example embodiment of the invention.

FIG. 9 is a front view of a portion of a bipolar electrode used in the bipolar battery of this example embodiment. In the first example embodiment described above, the intervals between adjacent electrode patterns in the Y direction are different. In the second example embodiment, however, the intervals between adjacent electrode patterns 42a are substantially the same (including manufacturing error), but the sizes (areas) of the electrode patterns 42a are different, respectively. More specifically, as shown in FIG. 9, the size (i.e., the width in the Y direction) of the electrode patterns 42a is reduced from the outer peripheral portion side of the bipolar electrode (collector) toward the central portion side. That is, the intervals between adjacent electrode patterns 42a in the Y direction are all a fixed value "dk" (which is an arbitrary value), while the widths W1 to W5 of the electrode patterns 42a are such that "W5>W4>W3>W2>W1". Even with the structure shown in FIG. 9, the formation density of the electrode patterns 42a on the central portion side of the bipolar electrode may be made less than the formation density of the electrode patterns 42a on the outer peripheral portion side, thereby enabling the heat radiation efficiency on the central portion side of the bipolar electrode to be improved. This makes it possible to suppress variation in the temperature distribution on the bipolar electrode.

Incidentally, in the structure shown in FIG. 9, the widths W1 to W5 of all of the electrode patterns 42a lined up in the Y direction are different. However, at least two electrode patterns that have substantially the same widths may also be included. Also, even in the structure in this second example embodiment, the thickness of the electrode patterns 42a may be made different or the density of the active material of which the electrode patterns are formed may be made different, as described in the first example embodiment. Further, in the bipolar battery having a stacked structure, the structures of the electrode patterns on the bipolar electrode may be made different depending on the position of the bipolar electrode in the stacking direction. More specifically, when comparing an electrode pattern 42a of a bipolar electrode positioned on the center layer side with an electrode pattern 42a, which is in a corresponding position, of a bipolar electrode positioned on the outer layer side, the width of the electrode pattern 42a of the bipolar electrode positioned on the center layer side may be made smaller than the width of the electrode pattern 42a, which is in a corresponding position, of the bipolar electrode positioned on the outer layer side. As a result, the heat radiation efficiency may be made different depending on the position in the stacking direction, which makes it possible to suppress variation in the temperature distribution also in the stacking direction of the bipolar battery.

Also, the structures shown in FIGS. 4 and 8 described in the first example embodiment may also be applied to the second example embodiment. That is, in the structures of the bipolar electrodes shown in FIGS. 4 and 8, the widths of the electrode patterns are substantially constant while the intervals between adjacent electrode patterns are different. However, the intervals between adjacent electrode patterns may be made substantially constant while the widths of the electrode patterns may be made different. More specifically, in the structure of the bipolar electrode shown in FIG. 4, the intervals between adjacent electrode patterns in the X direction may be made substantially the same while the widths (i.e., the lengths in the X direction) of the electrode patterns positioned on the upper side in FIG. 4 may be made narrower than the widths of the electrode patterns positioned on the lower side in FIG. 4. Also, in the structure of the bipolar electrode shown in FIG. 8, the intervals between adjacent electrode patterns in the radial direction may be made substantially the same while the widths of the electrode patterns positioned on the central portion may be made narrower than the widths of the electrode patterns positioned on the outer peripheral side. Incidentally, in addition to the structure described above, as described with FIG. 7 and the like, the thicknesses of the electrode patterns may be made different or the densities of the active material included in the electrode patterns may be made different. The same effects obtained with the structures shown in FIGS. 4 and 8 may be obtained with the foregoing structure as well. That is, it is possible to suppress variation in the temperature distribution on the bipolar electrode.

Meanwhile, in the foregoing first and second example embodiments, the electrode patterns that serve as the positive electrode layer and the electrode patterns that serve as the negative electrode layer have the same structure. However, it is also possible to have only one of those electrode layers be structured as described in the foregoing first or second example embodiments. In this case, the structure of the other electrode layer may be such that an electrode layer is formed on the entire surface of the collector. Also, the secondary battery or capacitor described in the foregoing first and second example embodiments may be used as a power storing apparatus for driving a motor in, for example, an electric vehicle (EV), a hybrid vehicle (HEV), or a fuel cell vehicle (FCV).

On the other hand, in the foregoing first and second example embodiments, the structure of the electrode patterns is set taking into account heat radiation characteristics of the bipolar battery itself. However, the electrode patterns may also be formed taking into account the heat radiation characteristics of the bipolar battery that are associated with thermal effects from the outside. This will now be described in detail. For example, when a heat source (such as an engine or a motor) is arranged near the bipolar battery, a region on the heat source side of the bipolar battery may be less able to radiate heat than other regions due to the fact that the region is thermally effected by the heat source. Therefore, by making the formation density of the electrode patterns in the region on the heat source side lower than the formation density of the electrode patterns in other regions, variation in the temperature distribution of the electrode pattern may be suppressed. That is, as in the foregoing first and second example embodiments, by making the formation density of the electrode patterns different, the heat radiation on the bipolar electrode may be improved, thereby suppressing a temperature increase on the bipolar electrode.

Here, the formation density of the electrode patterns may be set by taking into account the temperature distribution characteristics on the bipolar electrode based on the thermal effects from the heat source. For example, in addition to the structures of the bipolar electrodes described in the foregoing first and second example embodiments, the formation density of the electrode patterns in the region on the heat source side (i.e., the region on one of the outer peripheral portion sides) may be made lower than the formation density of the electrode patterns in another region (i.e., the region on the other outer peripheral portion side). Also, when the temperature increase is the greatest (when the heat radiation is the lowest) in the region on the heat source side of the bipolar electrodes due to the thermal effect from the heat source, the formation density of the electrode patterns in the region on the heat source side may be made the lowest.

On the other hand, with respect to a bipolar battery in which bipolar electrodes are stacked, when the heat source is arranged in the stacking direction, the formation densities of the electrode patterns in the corresponding region in the stacking direction of the plurality of bipolar electrodes may be made different. More specifically, of the plurality of stacked bipolar electrodes, the formation density of the electrode patterns of the bipolar electrode(s) (one or a plurality thereof) positioned on the heat source side (i.e., on one of the outermost layer sides in the stacking direction) may be made lower than the formation density of the electrode patterns of another bipolar electrode (such as a bipolar electrode positioned on the other outermost layer side in the stacking direction). In this case, the formation density of the electrode patterns of the bipolar electrode positioned on the center layer side in the stacking direction and the outermost layer side on the heat source side may be made lower than the formation density of the electrode patterns on the other bipolar electrode. This structure makes it possible to suppress variation in the temperature distribution in the stacking direction. Incidentally, when the heat radiation characteristics of the bipolar electrode positioned on the outermost layer side on the heat source side are the lowest, the formation density of the electrode patterns on this bipolar electrode may also be made the lowest. Methods for making the formation densities of the electrode patterns different include changing the intervals between adjacent electrode patterns (see FIG. 1), changing the thickness of the electrode patterns (see FIG. 7), and changing the size of the electrode patterns, as described in the foregoing first and second example embodiments.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention defined in the claims.

The invention claimed is:

1. An electrode for a power storing apparatus comprising:
a collector; and a plurality of electrode patterns with active material that are formed on at least one surface of the collector, wherein an electrode pattern with active material in a region where heat is radiated less than in another region, from among the plurality of electrode patterns with active material, is formed having a lower active material density than an active material density of an electrode pattern formed with active material in the other region, wherein the region where heat is radiated less than in other region is a central portion on the collector, and the other region is an outer periphery portion of the collector, wherein an interval between adjacent electrode patterns with active material on the central portion of the collector is formed larger than an interval between adjacent electrode patterns with active material on the outer periphery portion of the collector, and wherein the intervals throughout the entire length of the collector become gradually smaller towards the outer periphery portion.

2. The electrode for a power storing apparatus according to claim 1, wherein the plurality of electrode patterns with active material are formed such that the interval between adjacent electrode patterns with active material becomes larger from the outer periphery portion of the collector toward the central portion on the collector.

3. The electrode for a power storing apparatus according to claim 1, wherein each of the plurality of electrode patterns with active material has substantially the same size.

4. The electrode for a power storing apparatus according to claim 1, wherein a size of the electrode pattern with active material positioned on the central portion of the collector is formed smaller than a size of the electrode pattern with active material positioned on the outer periphery portion of the collector.

5. The electrode for a power storing apparatus according to claim 4, wherein the plurality of electrode patterns with active material are formed such that the size of the electrode patterns with active material becomes smaller from the outer periphery portion of the collector toward the central portion on the collector.

6. The electrode for a power storing apparatus according to claim 1, wherein a thickness of the electrode pattern with active material positioned on the central portion of the collector is formed thinner than a thickness of the electrode pattern with active material positioned on the outer periphery portion of the collector.

7. The electrode for a power storing apparatus according to claim 1, wherein when the electrode is cylindrically rolled up, an interval between adjacent electrode patterns with active material on an inside in a radial direction of the power storing apparatus, from among the plurality of electrode patterns with active material, is formed larger than an interval between adjacent electrode patterns with active material on an outside in the radial direction of the power storing apparatus.

8. The electrode for a power storing apparatus according to claim 1, wherein when the electrode is cylindrically rolled up, a size of an electrode pattern with active material on an inside in a radial direction of the power storing apparatus, from among the plurality of electrode patterns with active material, is formed smaller than a size of an electrode pattern with active material on an outside in the radial direction of the power storing apparatus.

9. The electrode for a power storing apparatus according to claim 1, wherein a density of active material of the electrode pattern with active material positioned on the central portion of the collector is lower than a density of active material of the electrode pattern with active material positioned on the outer periphery portion of the collector.

10. The electrode for a power storing apparatus according to claim 1, wherein when a heat source is arranged adjacent to the power storing apparatus, an electrode pattern with active material in a region adjacent to the heat source, from among the plurality of electrode patterns with active material, is formed having a lower active material density than an active material density of an electrode pattern formed with active material in another region.

11. The electrode for a power storing apparatus according to claim 1, wherein the plurality of electrode patterns are arranged concentrically around an electrode pattern that is arranged at the central portion of the collector.

12. The electrode for a power storing apparatus according to claim 11, wherein the internals between adjacent electrode patterns on the central portion of the collector are wider than intervals between adjacent electrode patterns on the outer peripheral portion of the collector.

13. A power storing apparatus comprising:

the electrode according to claim 1 which is used as at least one of a positive electrode and a negative electrode.

14. An electrode for a power storing apparatus comprising:

a collector; and a plurality of electrode patterns with active material that are formed on at least one surface of the collector, wherein an electrode pattern with active material in a region where heat is radiated less than in other region, from among the plurality of electrode patterns with active material, is formed having a lower active material density than an active material density of an electrode pattern formed with active material in the other region, wherein the region where heat is radiated less than in other region is a central portion on the collector, and the other region is an outer periphery portion of the collector, and wherein an interval between adjacent electrode patterns with active material on the central portion of the collector is formed larger than an interval between adjacent electrode patterns with active material on the outer periphery portion of the collector, and wherein when the plurality of electrode patterns with active material are formed substantially concentric on the collector, an interval between adjacent electrode patterns with active material on a radial inside, from among the plurality of electrode patterns with active material, is formed wider than an interval between adjacent electrode patterns with active material on a radial outside.

15. A power storing apparatus comprising:

a plurality of stacked electrodes, each of the plurality of stacked electrodes including a collector and a plurality of electrode patterns with active material formed on at least one surface of the collector, wherein an electrode pattern with active material in a region where heat is radiated less than in other region among the plurality of stacked electrodes, is formed having a lower active material density than an active material density of an electrode pattern formed with active material in the other region, and the active material densities of the plurality of electrode patterns formed with active material among the plurality of stacked electrodes, differ from one another depending on position of the electrode in the stacking direction.

* * * * *

UNITED STATES PATENT AND TRADEMARK OFFICE
CERTIFICATE OF CORRECTION

PATENT NO.       : 8,637,178 B2                                                  Page 1 of 1
APPLICATION NO. : 12/438402
DATED            : January 28, 2014
INVENTOR(S)      : Yoshiyuki Nakamura It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1073 days.

Signed and Sealed this
Twenty-second Day of September, 2015

Michelle K. Lee
*Director of the United States Patent and Trademark Office*